United States Patent
Manzardo

(12) 
(10) Patent No.: US 6,735,196 B1
(45) Date of Patent: May 11, 2004

(54) SYSTEM AND METHOD FOR PARTIALLY EMULATING PERIPHERALS IN HARDWARE FOR IMPROVING DELAY TOLERANCE IN MASTER-SLAVE TYPE COMMUNICATION SYSTEMS

(75) Inventor: Marcel Manzardo, Los Gatos, CA (US)

(73) Assignee: Siemens Information & Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/562,793

(22) Filed: May 2, 2000

(51) Int. Cl.$^7$ .................................................. H04J 3/24
(52) U.S. Cl. ...................... 370/386; 370/449; 379/225; 379/269
(58) Field of Search ................................. 370/270, 386, 370/401, 410, 411, 422, 423, 449, 522; 379/225, 268, 269, 279

(56) References Cited

U.S. PATENT DOCUMENTS

| | | | | |
|---|---|---|---|---|
| 3,702,008 A | * | 10/1972 | Groth | 710/220 |
| 4,951,278 A | * | 8/1990 | Biber et al. | 370/474 |
| 5,170,394 A | * | 12/1992 | Biber et al. | 370/449 |
| 5,694,543 A | * | 12/1997 | Inoue | 714/4 |
| 6,553,434 B1 | * | 4/2003 | Abkarian et al. | 710/18 |

* cited by examiner

Primary Examiner—Hassan Kizou
Assistant Examiner—Michael McLoughlin

(57) ABSTRACT

A partial emulation technique in which only the answers to poll frames and uplink information frames, or the slave part of the protocol, are emulated. All messages from the processor are passed down-link, and emulation is dependent upon the contents of an attendant list (452). In operation, the attendant list (452) is built by detecting responses to poll frames from the main controller (401). Once entries are made in the attendant list, partial emulation of responses to down link poll frames and up link information frames for each entry is allowed. No emulation of down link information frames occurs.

18 Claims, 7 Drawing Sheets

SYSTEM AND METHOD FOR PARTIALLY EMULATING PERIPHERALS IN HARDWARE FOR IMPROVING DELAY TOLERANCE IN MASTER-SLAVE TYPE COMMUNICATION SYSTEMS

BACKGROUND OF THE INVENTION

1. Field of the Invention

The present invention relates to telecommunication systems and, particularly, to a system and method for improving delay tolerance in master-slave type communication systems.

2. Description of the Related Art

Typical telecommunications equipment uses a master-slave method for passing information from the central processor to the peripherals. FIG. 1 illustrates a typical conventional distributed telecommunications system. The system 10 includes a main switch 100 connected to a remote shelf 104 using a conventional communications link, such as an isochronous circuit-switched network. Typically, the main switch 100 can be connected to additional remote shelves, as well as to the central office (CO) of a common carrier using a public switched telephone network. One or more peripheral units 108a–108n, such as telephones, modems, fax machines, etc., can be connected to the remote shelf 104. The main switch 100 may be a networked switch for providing switching and call setup services to the remote shelf 104 and, in particular, may be implemented as a computerized branch exchange (CBX) or private branch exchange (PBX), such as the Hicom 300E manufactured by Siemens Corporation.

Signaling information is exchanged between the processor on the main switch and the peripherals using a protocol such as the high level data link control (HDLC) protocol. In HDLC, peripherals are accessed via a unique address and serviced on a round-robin basis, with each peripheral receiving a poll frame and sending its response (either an information frame or an acknowledge frame).

Signaling flow is illustrated in FIG. 2. As shown, the controller 102 communicates with the peripheral 108 via transactions 202, 204, 206. In transaction 202, the controller sends a poll frame 203a to the peripheral 108 and receives an acknowledgement frame 203b in response. In transaction 204, the controller 102 sends a poll frame 205a, receives an information frame 205b, and returns an acknowledgement frame 205c. In transaction 206, the controller 102 sends an information frame 207a and receives an acknowledgement frame 207b. Each response typically generates an interrupt, telling the controller that the peripheral has received an information frame or a poll frame.

The signaling controller has to wait for each message to reach the target and wait for the response to arrive before the next target can be addressed. As delays are introduced between the controller 102 and the, peripherals 108, it takes much longer to complete a full cycle servicing all the peripherals. Thus, this technique is relatively intolerant to delays and requires peripherals to be located in relatively close proximity to the signaling controller.

Consequently, in order to implement remote peripherals, some conventional telecommunications systems network Private Branch Exchanges (PBX) via specialized protocols. However, such networking does not provide feature transparency and is a relatively expensive solution.

An alternative is using specialized remote peripherals that differ in both hardware and software from regular peripheral cards. However, this requires relatively high development effort and significant changes at the main site. Existing peripherals and controllers cannot be used.

Another alternative is to fully emulate the peripherals at the main location and duplicate the peripheral controller at the remote site. This requires specialized hardware and relatively complex software. In particular, the signaling controller must be duplicated at the remote end and adding new peripherals can affect the emulation hardware and software, making it difficult to implement changes. Moreover, inconsistencies can occur because the signaling controller is always emulating a state that is older than the actual state.

For example, returning to FIG. 1, in such systems, the main switch 100 includes a controller (not shown) including an emulator 102 for fully emulating the peripherals 108a–108n. The remote shelf 104 also includes an emulator 106 for duplicating the functions of the controller. An exemplary controller-emulator system is the RCMX system available from Siemens Corporation. The emulator 102 communicates with the emulator 106 using a conventional call setup protocol such as the high level data link control language (HDLC).

In order to emulate downlink information frames, all pre-acknowledged information frames need to be kept in buffers (not shown) until acknowledged by the peripherals. Thus, the number of required buffers is large and the logic needed to control the buffers is relatively complex. Moreover, error cases for downlink information frames are more complicated than for uplink information frames and the error handling in hardware without software and processor control is not feasible.

SUMMARY OF THE INVENTION

These and other problems in the prior art are overcome in large part by a system and method according to the present invention. A partial emulation technique is provided in which only the answers to poll frames and uplink information frames, or the slave part of the protocol, are emulated. All messages from the processor are passed down-link, and emulation is dependent upon the contents of an attendant list.

In operation, the attendant list is built by detecting responses to poll frames from the main controller. Once entries are made in the attendant list, partial emulation of responses to down link poll frames and up link information frames for each entry is allowed. No emulation of down link information frames occurs.

A partial emulation system according to an implementation of the present invention includes a local partial emulation unit and one or more remote partial emulation units. The local partial emulation unit includes a local partial emulation controller, the attendant list, a plurality of buffers for buffering up link information frames and acknowledge frames, and a plurality of timers for maintaining a timeout period (i.e., maximum transaction time). The remote partial emulation unit includes a remote partial emulation controller and a plurality of timers for maintaining a timeout period.

BRIEF DESCRIPTION OF THE DRAWINGS

A better understanding of the invention is obtained when the following detailed description is considered in conjunction with the following drawings in which.

DETAILED DESCRIPTION OF THE INVENTION

FIGS. 3–8 illustrate an improved master-slave type distributed communication system. A partial emulation technique is provided in which only the answers to poll frames and uplink information frames, or the slave part of the protocol, are emulated. All messages from the processor are passed down-link, and emulation is dependent upon the contents of an attendant list.

Figure 1:
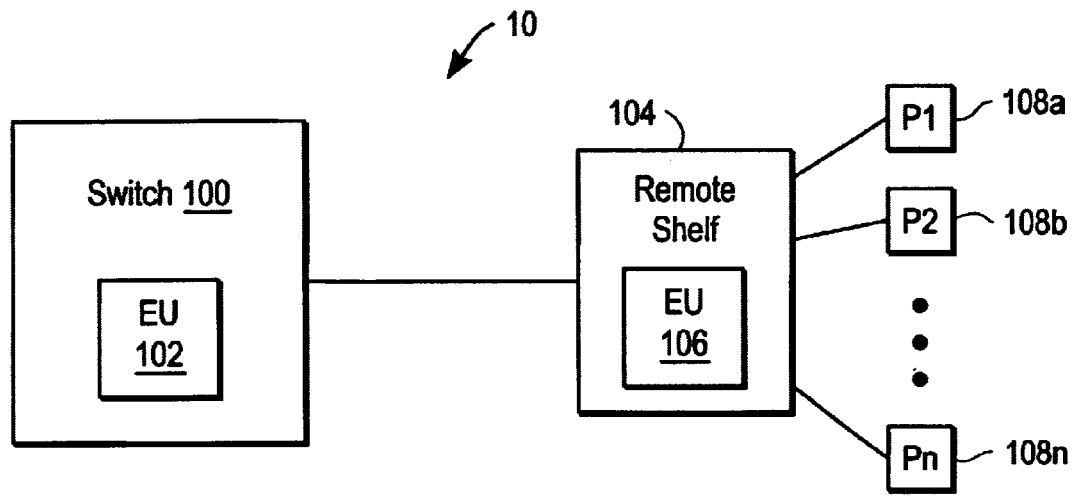
FIG. 1 is a diagram illustrating a system according to the prior art.
Figure 3:
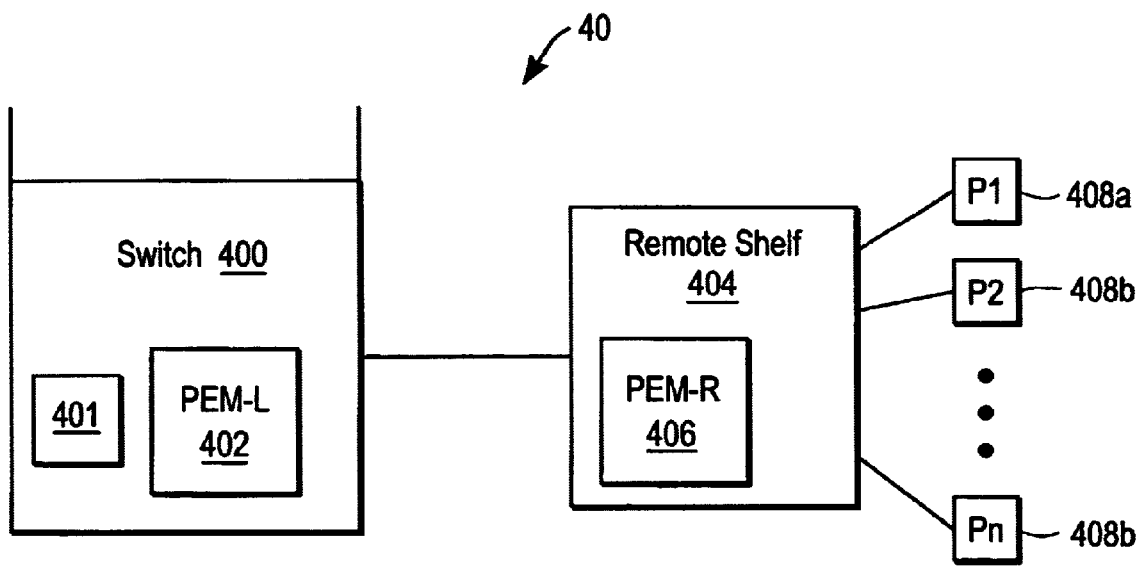
FIG. 3 is a block diagram of a system according to an implementation of the present invention.
Figure 2:
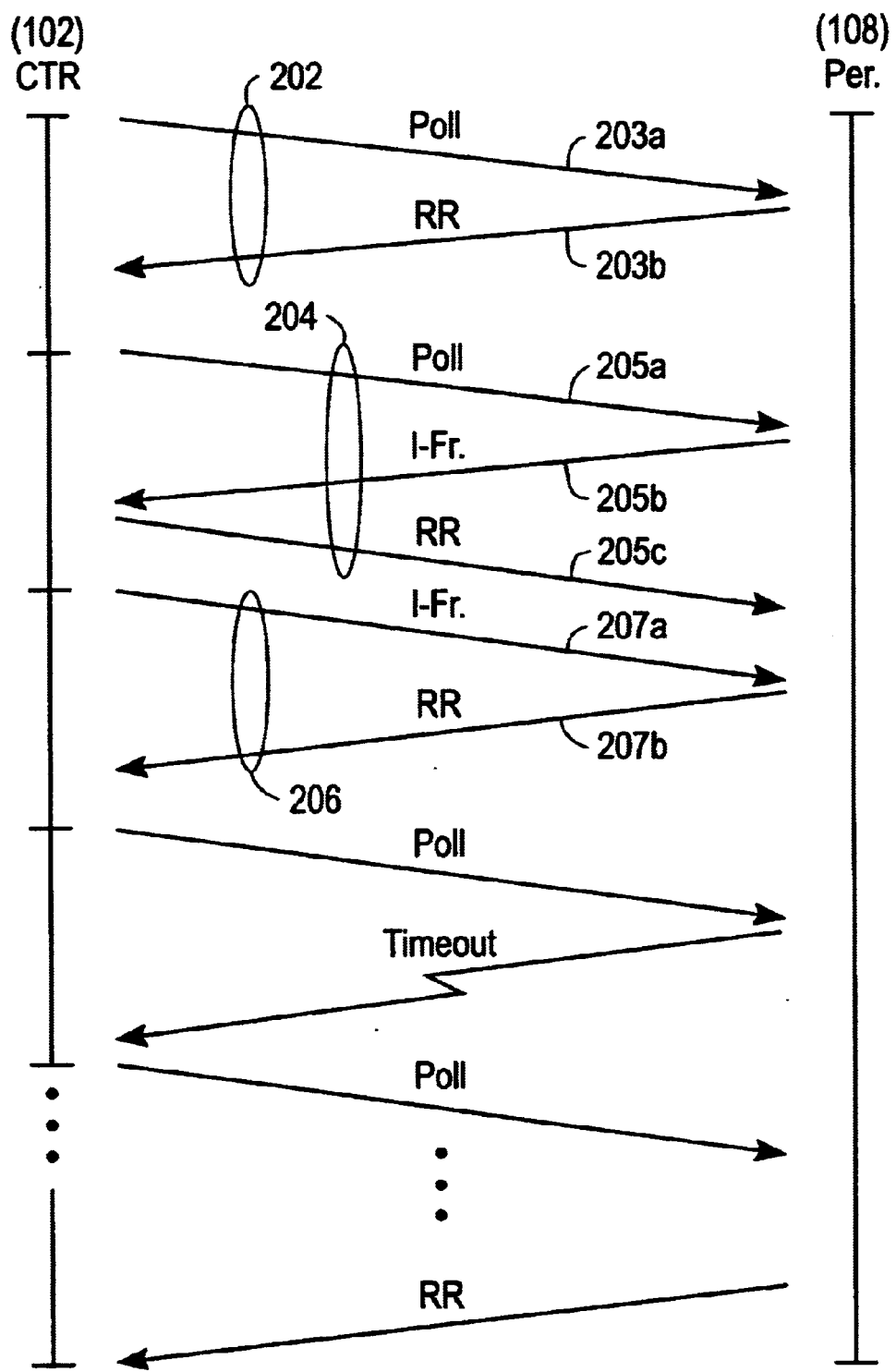
FIG. 2 is a diagram illustrating HDLC signaling according to the prior art.

Turning now to FIG. 3, a block diagram of a system 40 including partial emulation according to an implementation of the present invention is shown. The system includes a switch 400, such as a PBX, coupled via a communications link to one or more remote shelves 406. One or more peripheral units 408a–408n, such as telephones, modems, fax machines, etc., are connected to the remote shelf 404. The switch includes a main controller 401 and a local partial emulation unit 402 according to an implementation of the present invention. The remote shelf 404 similarly includes a remote partial emulation unit 404 according to an implementation of the present invention. The main controller 401 may be implemented as any of a variety of HDLC controllers and provides error recovery from corruption at any level in the link from the main controller to the peripheral.

Figure 4A:
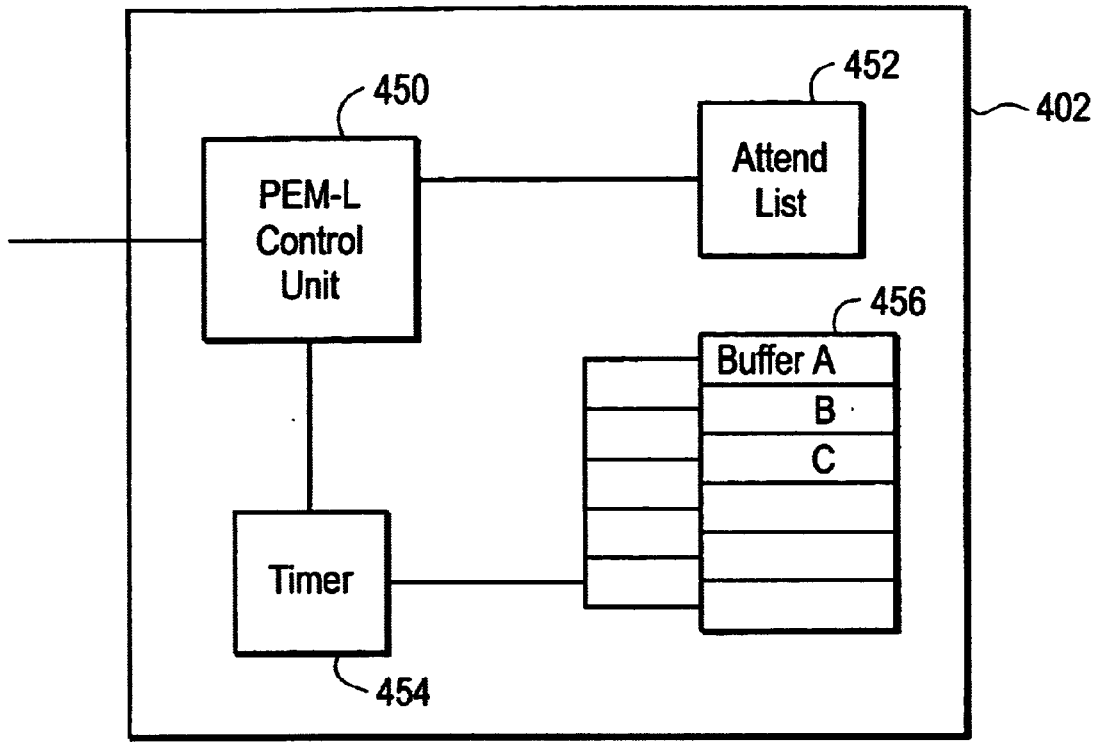
FIGS. 4A and 4B are block diagrams of partial emulation units according to an implementation of the present invention.

An exemplary local partial emulation unit 402 is illustrated in FIG. 4A. The local partial emulation unit 402 includes a control unit 450, a plurality of buffers 456, one or more timers 454, and a memory for maintaining attendant lists 452, as will be explained in greater detail below. The control unit 450 may be implemented as any of a variety of processors or microcontrollers or application specific integrated circuits (ASIC). A buffer 456, a timer 454, and an entry on the attendant list 452 are provided for each HDLC address polled by the controller 401 (FIG. 3). The buffers 456 are adapted to store only acknowledge frames and uplink information frames from the peripherals, as will be explained in greater detail below. All down-link information frames are passed to the peripherals by the PEM-L control unit 450. The timers are used to time a predetermined timeout period. If no response to a poll frame is received from the peripheral within the timeout period, the peripheral is removed from the attendant list.

Figure 4B:
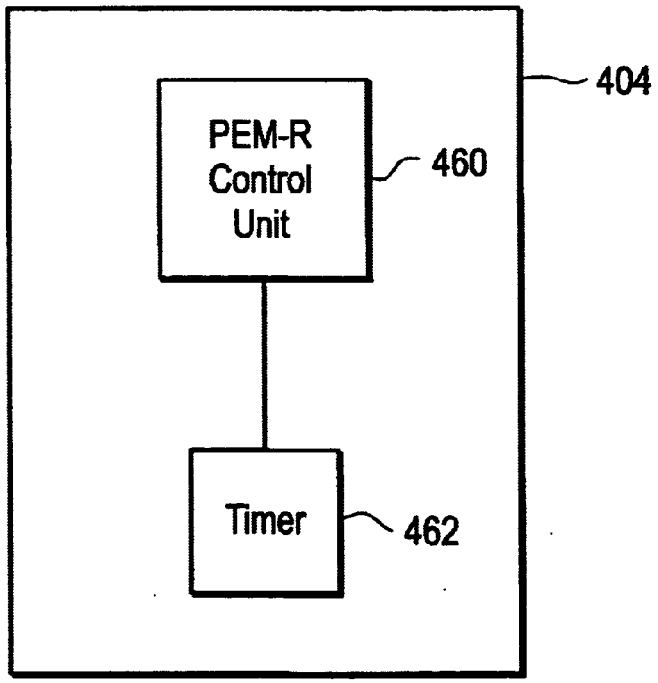

FIG. 4B illustrates an exemplary remote partial emulation unit 404. The remote partial emulation unit 404 includes a remote partial emulation (PEM-R) control unit 460 and one or more timers 462. The control unit 460 may be implemented as any of a variety of processors or microcontrollers or application specific integrated circuits (ASIC). The timer 462 is used to time a predetermined timeout period. More particularly, as will be explained in greater detail below, a down link information frame must have its transaction completed, or the timer timeout, before a next down link message (either information frame or poll frame) is allowed to be sent.

Figure 5:
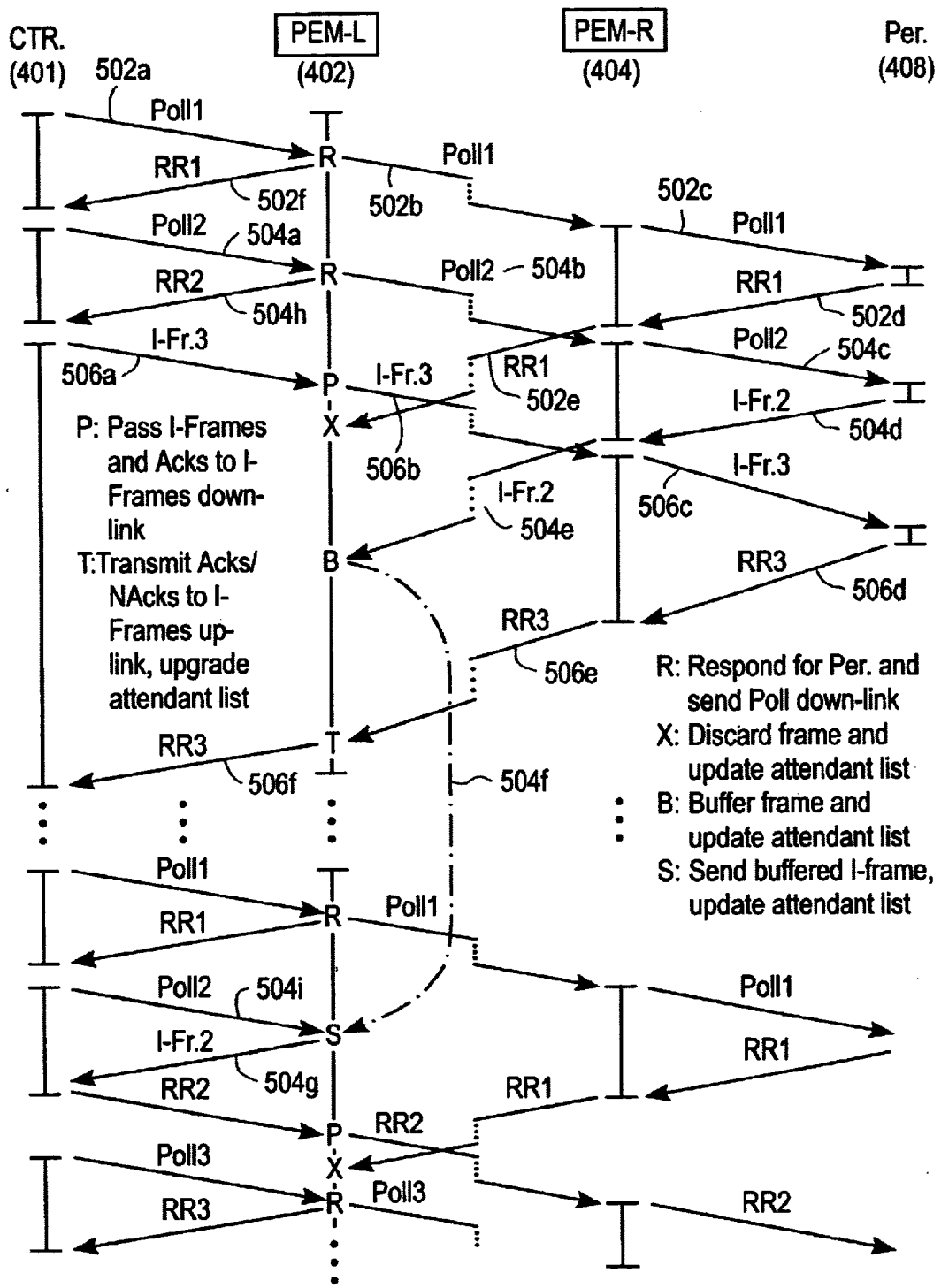
FIG. 5 is a diagram illustrating partial emulation signaling flow according to an implementation of the present invention.

Basic signaling flow for an implementation of the invention is shown in FIG. 5. Signaling sequence 502a–502f illustrates handling of poll frames when acknowledgement frames are returned. Initially, the controller 401 issues a poll frame Poll (502a). The poll frame Poll1 is received by the local partial emulation unit 402. The local partial emulation unit 402 immediately returns an acknowledgement frame RR1 (502f). The partial emulation unit 402 further transmits the poll frame Poll1 downlink to the remote partial emulation unit 404 (502b). The remote partial emulation unit forwards the poll frame Poll1 to the peripheral 408 (502c). The peripheral 408 responds with an acknowledgement frame RR1 (502d), which is then forwarded by the remote partial emulation unit 404 to the local emulation unit 402 (502e). Because the local partial emulation unit 402 already provided the acknowledgement frame RR1 to the controller 401, the local partial emulation unit 402 discards the received acknowledgement frame RR1. In addition, the local partial emulation unit updates its attendant list.

Sequence 504a–504h illustrates handling of signaling flow for poll frames and information frames received from the peripheral. Initially, the controller 401 sends a poll frame Poll2 (504a). The local partial emulation unit 402 responds by returning an acknowledgement frame RR2 back to the controller (504h). The local partial emulation unit 402 further sends the poll frame Poll2 to the remote partial emulation unit 404 (504b). The remote partial emulation unit 404 in turn sends the poll frame Poll2 to a next peripheral 408 (504c). As shown, the peripheral 408 sends an information frame I-Fr.2 uplink to the remote partial emulation unit 404 (504d), which forwards it to the local partial emulation unit 402 (504e). The local partial emulation unit 402 buffers the received information frame I-Fr.2 and updates its attendant list (504f). The next time the HDLC address is polled (504i), the information frame I-Fr.2 is transmitted to the controller (504g) and the attendant list is updated.

Sequence 506a–506f illustrates handling of downlink transmission of information frames. Initially, an information frame I-Fr.3 is passed to the local partial emulation unit 402 (506a). The local partial emulation unit 402 passes the information frame I-Fr.3 to the remote partial emulation unit 404 (506b) which, in turn, passes it to the peripheral 408. The peripheral 408 responds with an acknowledgement frame RR3, which is passed via the remote partial emulation unit 404 to the local partial emulation unit 402 (506d, 506e). The local partial emulation unit 402 then transmits the acknowledgement frame RR3 to the controller 401 and updates its attendant list (506f).

Figure 6:
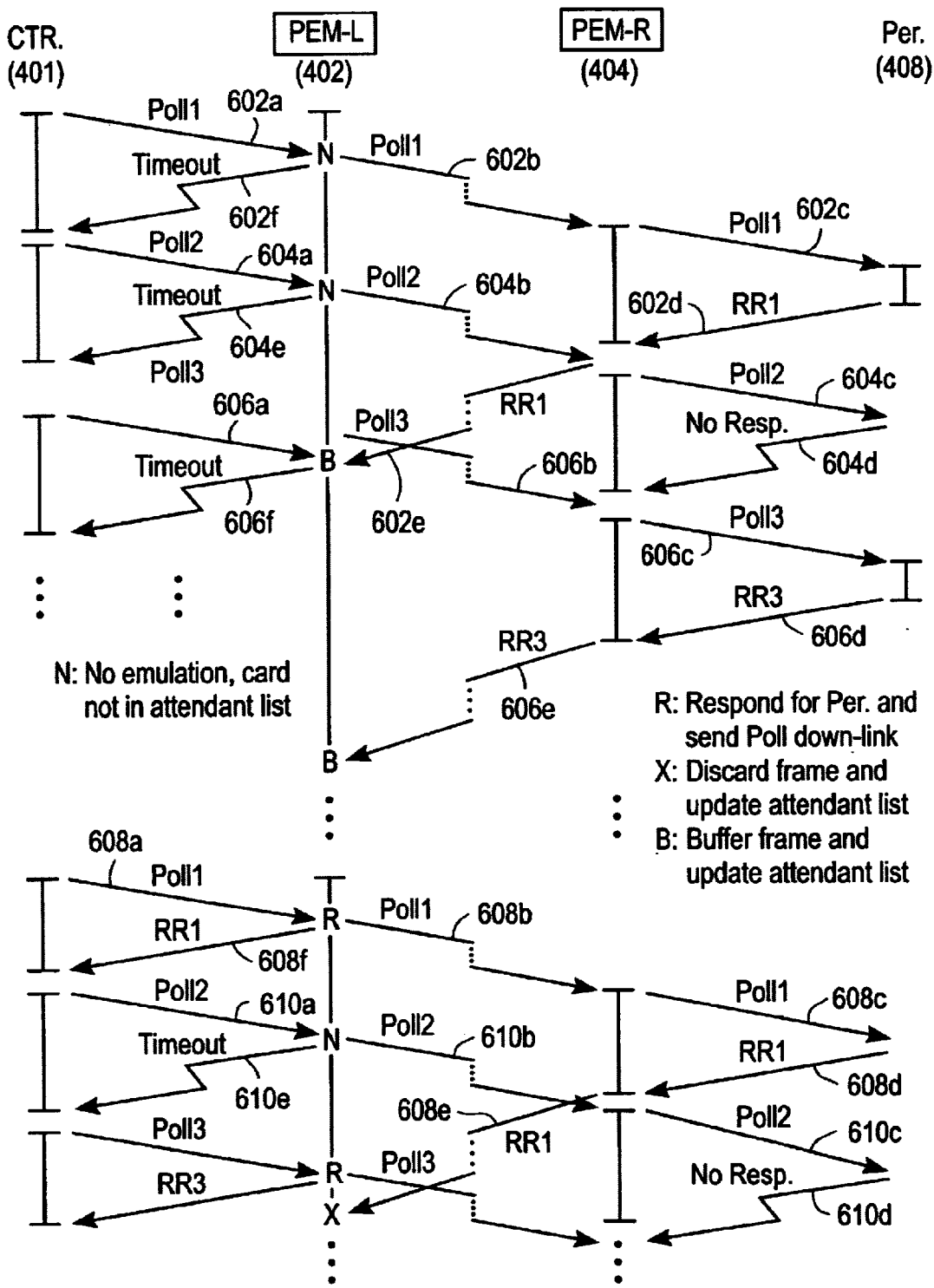
FIG. 6 is a diagram illustrating attendant list building according to an implementation of the present invention.

FIG. 6 illustrates the process of building the attendant list. As noted above, the attendant lists are built in response to initial poll messages. Sequence 602a–602f is an initial learning sequence, in which a peripheral is added to the attendant list. Initially, the controller 401 issues a poll frame Poll1 to the local emulation unit 402 (602a). Since the attendant list has not been made, the poll frame Poll1 is forwarded to the remote partial emulation unit 404 (602b) and a timeout occurs (602f). The remote partial emulation unit 404 forwards the poll frame Poll1 to the peripheral 408

(602c), which responds with an acknowledgement frame RR1 (602d). Next, the acknowledgement frame RR1 is forwarded to the local partial emulation unit 402, where it is buffered and the attendant list is updated (602e). The next time the poll frame Poll1 is sent, the system responds with partial emulation in a manner similar to that described above with reference to FIG. 5 (Sequence 608a–608f). A similar procedure is shown with reference to the poll frame Poll3 and sequence 606a–606f.

Sequence 604a–604e illustrates initial signaling when a peripheral fails to respond. As in the case of poll frame Poll1, the poll frame Poll2 is sent from the controller 401 to the local partial emulation unit 402 (604a) and a timeout occurs (604e). The local partial emulation unit 402 undertakes no emulation, since the peripheral card is not yet on the attendant list. The poll frame Poll2 is then forwarded via the remote partial emulation unit 404 to the peripheral 408 (604b, 604c). In this case, the peripheral 408 fails to respond (604d) and, consequently, is not added to the attendant list.

The next time poll frame Poll2 is issued (sequence 610a–610e), no emulation occurs, since the peripheral was not found to be in the attendant list. Thus, as shown, the controller 401 issues the poll frame Poll2 to the local partial emulation unit 402 (610a) and a timeout occurs (610e). Because the designated peripheral is not in the attendant list, no partial emulation occurs and the local partial emulation unit merely forwards the poll frame Poll2 to the local partial emulation unit 404, which forwards it to the peripheral (610b, 610c), which does not respond (610d). If the peripheral that is not on the attendant list eventually comes back on line, it will respond to the poll frame, which is being forwarded to it. The controller 401 will then detect the response and update the attendant list.

Figure 7:
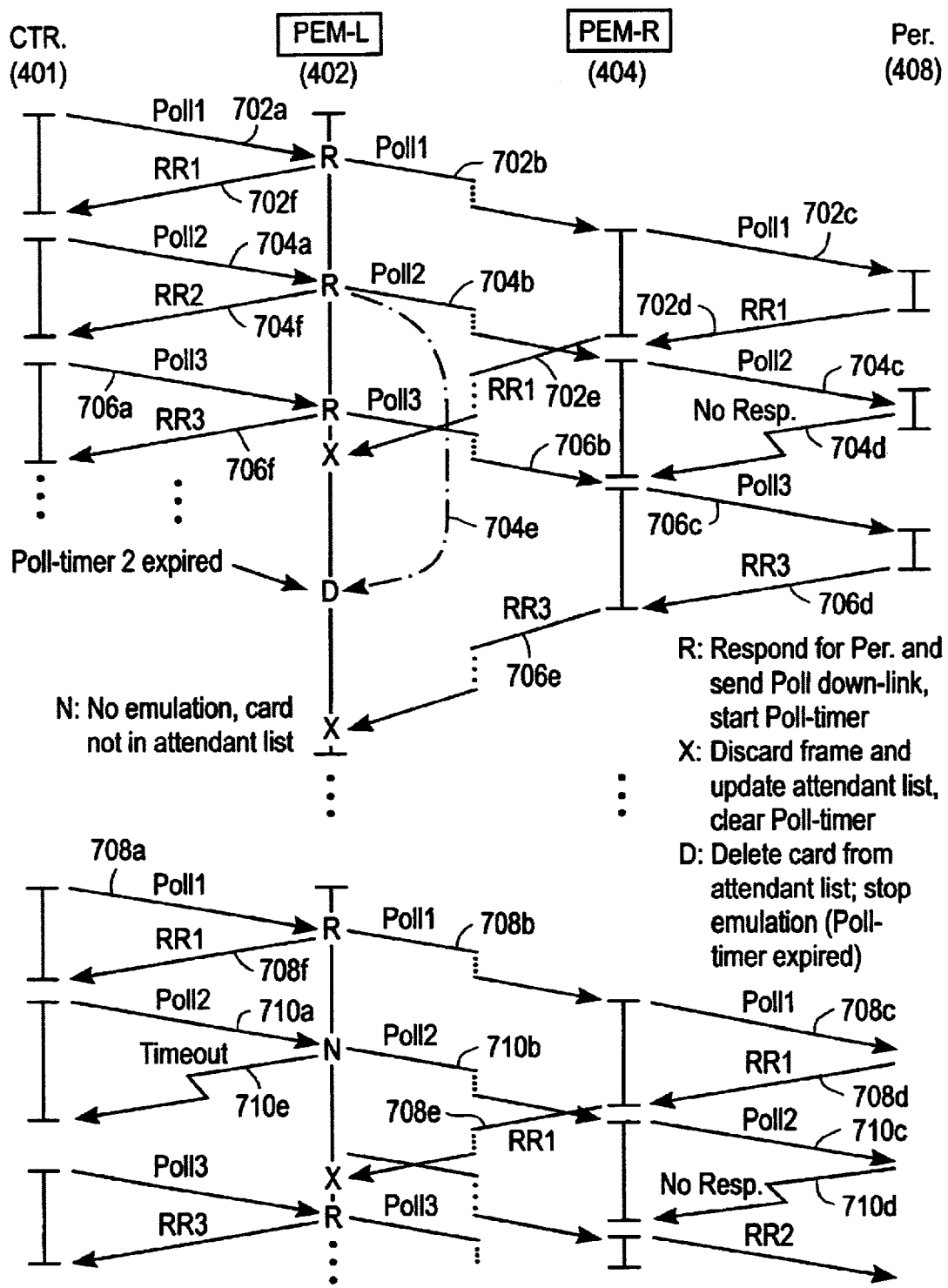
FIG. 7 is a diagram illustrating detection of a non-responsive peripheral according to an implementation of the present invention.

FIG. 7 illustrates the procedure undertaken when a peripheral has stopped responding. As discussed above, a poll timer is used for each poll frame. If no response is received within a predetermined period, then the peripheral is dropped from the attendant list and is no longer emulated.

More particularly, sequences 702a–702f, 706a–706f, and 708a–708f are emulation sequences similar to those described above. In sequence 704a–704f, however, a time out is shown. Initially, the controller 401 sends the poll frame Poll2 to the local partial emulation unit 402 (704a). Because the destination peripheral is in the attendant list, the local partial emulation unit 402 returns an acknowledgement frame RR2 to the controller 401 (704f). The local partial emulation unit 402 starts the poll timer for the poll frame Poll2 and forwards the poll frame Poll2 to the remote partial emulation unit 404 (704b). The remote partial emulation unit 404 then sends the poll frame Poll2 to the peripheral 408 (704c), which, in the example shown, fails to respond (704d). At some point, then, the timer expires (704e), the peripheral is deleted from the attendant list, and emulation stops. The next time the poll frame Poll2 is sent (sequence 710a–710e), no emulation occurs because the card is no longer in the attendant list. As shown, the poll frame Poll2 is forwarded by the partial emulation units (71a–710c), the peripheral does not respond (710d), and a timeout occurs (710e).

Figure 8:
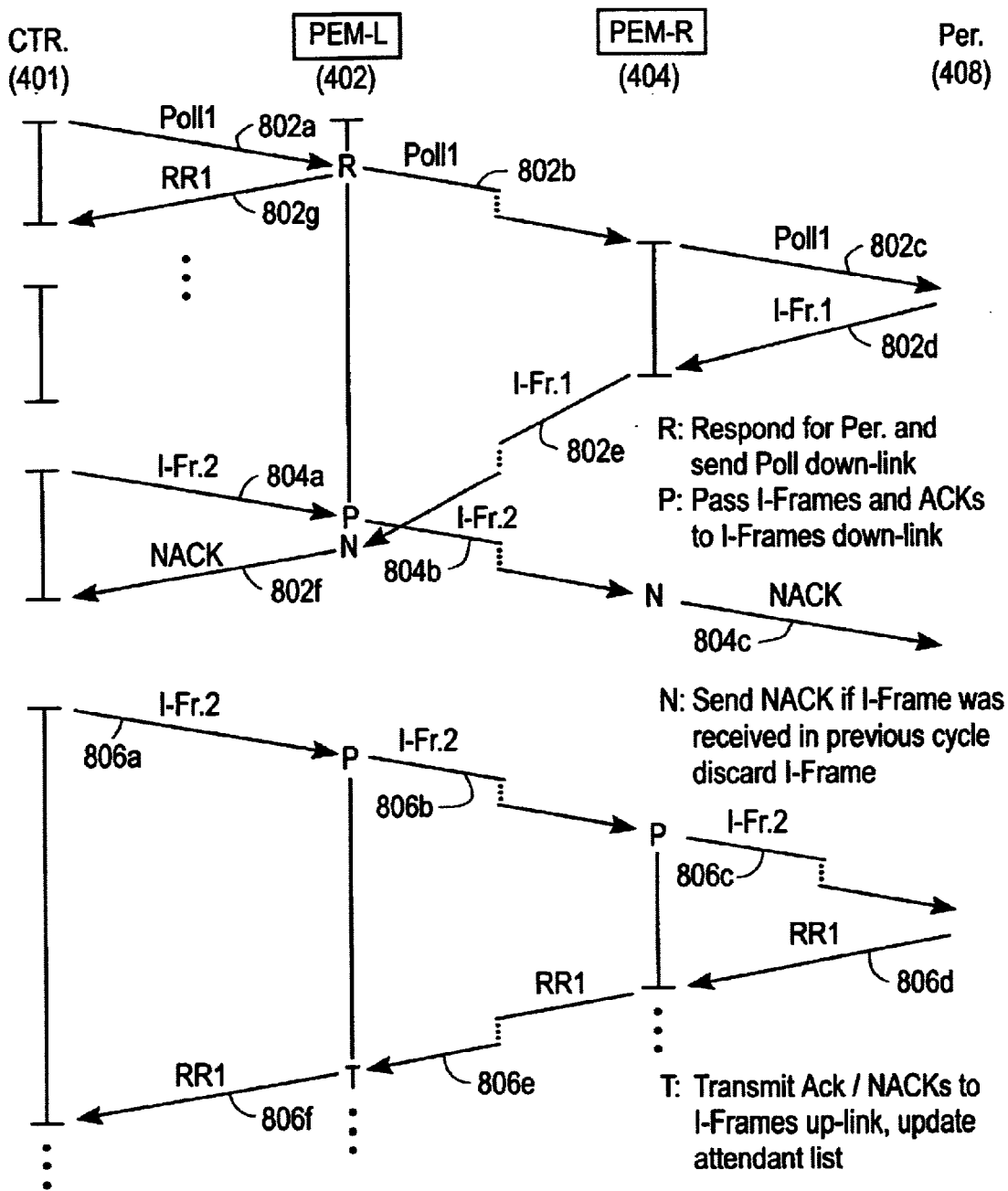
FIG. 8 is a diagram illustrating handling of simultaneous information frame detection according to an implementation of the present invention.

In one implementation of the invention, an information frame is not allowed to be sent from the controller 401 at the same time an information frame is received from the peripheral from a previous poll frame. If this occurs, a negative acknowledge is sent by the local partial emulation unit to the main controller 401, and a negative acknowledge is sent by the remote partial emulation unit to the peripheral. FIG. 8 illustrates this procedure.

Initially, the controller 401 sends a Poll frame Poll1 to the local partial emulation unit 404 (802a). The local partial emulation unit 404 performs an emulation by returning an acknowledge frame RR1 to the controller (802g). The local partial emulation unit 404 then passes the poll frame Poll to the remote partial emulation unit 404 (802b), which provides it to the peripheral 408 (802c). The peripheral 408 responds with an information frame I-Fr.1 (802d) to the remote partial emulation unit. The remote partial emulation unit passes the information frame I-Fr.1 to the local partial emulation unit 402 (802e). Because the controller may send an information frame I-Fr.2 before the poll sequence has been completed (804a), the local partial emulation unit 402 sends a negative acknowledge NACK (802f) to the controller 401. The local partial emulation unit 402 passes the information frame I-Fr.2 to the remote partial emulation unit 404 (804b), which provides a negative acknowledge NACK to the peripheral (804c). After the NACK is received from the local partial emulation unit, the controller 401 resends the information frame (sequence 806a–806f). The peripheral's information frame is resent the next time it receives a poll frame.

The invention described in the above detailed description is not intended to be limited to the specific form set forth herein, but is intended to cover such alternatives, modifications and equivalents as can reasonably be included within the spirit and scope of the appended claims.

What is claimed is:

1. A telecommunications method in a system including a main switch and one or more down link peripherals, comprising:

emulating responses to poll frames from said main switch; and emulating up link information frames; and passing down link information frames down link without emulation; and maintaining an attendant list of active ones of said one or more down link peripheral and performing said emulating responses if said one of more peripherals are on said attendant list.

2. A telecommunications method in accordance with claim 1, said emulating up link information frames comprising buffering at a local partial emulation unit said up link information frames until a poll frame is received at said local partial emulation unit.

3. A telecommunications method in accordance with claim 2, said emulating responses to poll frames comprising returning an acknowledgement frame from a local partial emulation unit to a main controller on said main switch upon receiving said poll frame and discarding a received acknowledge frame from said peripheral.

4. A telecommunications method in accordance with claim 3, said passing down link information frames without emulation comprising returning acknowledge frames up link from said peripheral.

5. A telecommunications method in a system including a main switch and one or more down link peripherals comprising:

emulating responses to poll frames from said main switch; and emulating up link information frames; and passing down link information frames down link without emulation;

said emulating up link information frames comprising buffering at a local partial emulation unit said up link information frames until a poll frame is received at said local partial emulation unit;

said emulating responses to poll frames comprising returning an acknowledgement frame from a local partial emulation unit to a main controller on said main switch upon receiving said poll frame and discarding a received acknowledge frame from said peripheral;

said passing down link information frames without emulation comprising returning acknowledge frames up link from said peripheral; and further comprising:

maintaining an attendant list of active ones of said one or more down link peripherals and not performing said emulating responses if said one or more peripherals are not on said attendant list.

6. A telecommunications method in a system including a main switch and one or more down link peripherals comprising:

emulating responses to poll frames from said main switch; and emulating up link information frames; and passing down link information frames down link without emulation;

said emulating up link information frames comprising at a local partial emulation unit said up link information frames until a poll frame is received at said local partial emulation unit;

said emulating responses to poll frames comprising returning an acknowledgement frame from a local partial emulation unit to a main controller on said main switch upon receiving said poll frame and discarding a received acknowledge frame from said peripheral;

said passing down link information frames without emulation comprising returning acknowledge frames up link from said peripheral; and further comprising removing inactive ones of said one or more peripherals from said attendant list if responses from said inactive ones are not received at said local partial emulation unit within a predetermined period from issuance of a poll frame.

7. A telecommunications system, comprising:

a main switch;

a local partial emulation unit; and one or more peripherals down link from said partial emulation unit;

wherein said main switch and said one or more peripherals implement a master-slave protocol and said local partial emulation unit is adapted to emulate a slave portion of said protocol for predetermined ones of said one or more peripherals.

8. A telecommunications system comprising:

a main switch;

a local partial emulation unit; and one or mere peripherals down link from said partial emulation unit;

said local partial emulation unit comprising:

a partial emulation control unit adapted to emulate up link information frames and down link poll frame responses;

an attendant list of active ones of said one or more peripherals;

a buffer for each of said active ones; and a timer for each entry in said attendant list, wherein said partial emulation control unit is adapted to remove said active ones from said attendant list if a response to a poll frame from said partial emulation control unit has not been received within a predetermined period on said timer.

9. A telecommunications system in accordance with claim 8, said partial emulation control unit adapted to pass down link information frames down link without emulation.

10. A telecommunications system in accordance with claim 9, further including a remote partial emulation unit.

11. A telecommunications system including a main switch and one or more down link peripherals, comprising:

means for emulating responses to poll frames from said main switch;

means for emulating up link information frames; and means for passing down link information frames down link without emulation;

means for maintaining an attendant list of active ones of said one or more down link peripherals, and performing said emulating responses if said one or more peripherals are on said attendant list.

12. A telecommunications system in accordance with claim 11, said emulating up link information frames means comprising means for buffering at a local partial emulation unit said up link information frames until a poll frame is received at said local partial emulation unit.

13. A telecommunications system in accordance with claim 12, said emulating responses to poll frames means comprising means for returning an acknowledgement frame from a local partial emulation unit to a main controller on said main switch up on receiving said poll frame and discarding a received acknowledge frame from said peripheral.

14. A telecommunications system in accordance with claim 13, said passing down link information frames without emulation means comprising means for returning acknowledge frames up link from said peripheral.

15. A telecommunications system including a main switch and one or more down link peripherals, comprising:

means for emulating responses to poll frames from said main switch;

means for emulating up link information frames; and means for passing down link information frames down link without emulation;

said emulating up link information frames means comprising means for buffering at a local partial emulation unit said up link information frames until a poll frame is received at said local partial emulation unit;

said emulating responses to poll frames means comprising means for returning an acknowledgement frame from a local partial emulation unit to a main controller on said main switch upon receiving said poll frame and discarding a received acknowledge frame from said peripheral;

said passing down link information frames without emulation means comprising means for returning acknowledge frames up link from said peripheral; and further comprising means for maintaining an attendant list of active ones of said one or more down link peripherals and not performing said emulating responses if said one or more peripherals are not on said attendant list.

16. A telecommunications system in accordance with claim 14, further comprising means for removing inactive ones of said one or more peripherals from said attendant list if responses from said inactive ones are not received at said local partial emulation unit within a predetermined period from issuance of a poll frame.

17. A telecommunications switch, comprising:

a main controller for performing signaling functions; and a local partial emulation unit including
  a partial emulation control unit adapted to emulate up link information frames and down link poll frame responses;
  an attendant list of active ones of said one or more peripherals;
  a buffer for each of said active ones; and
  a timer for each entry in said attendant list, wherein said partial emulation control unit is adapted to remove said active ones from said attendant list if a response to a poll frame from said partial emulation control unit has not been received within a predetermined period on said timer.

18. A telecommunications switch in accordance with claim 17, said partial emulation control unit adapted to pass down link information frames down link without emulation.

* * * * *